United States Patent Office 2,720,248
Patented Oct. 11, 1955

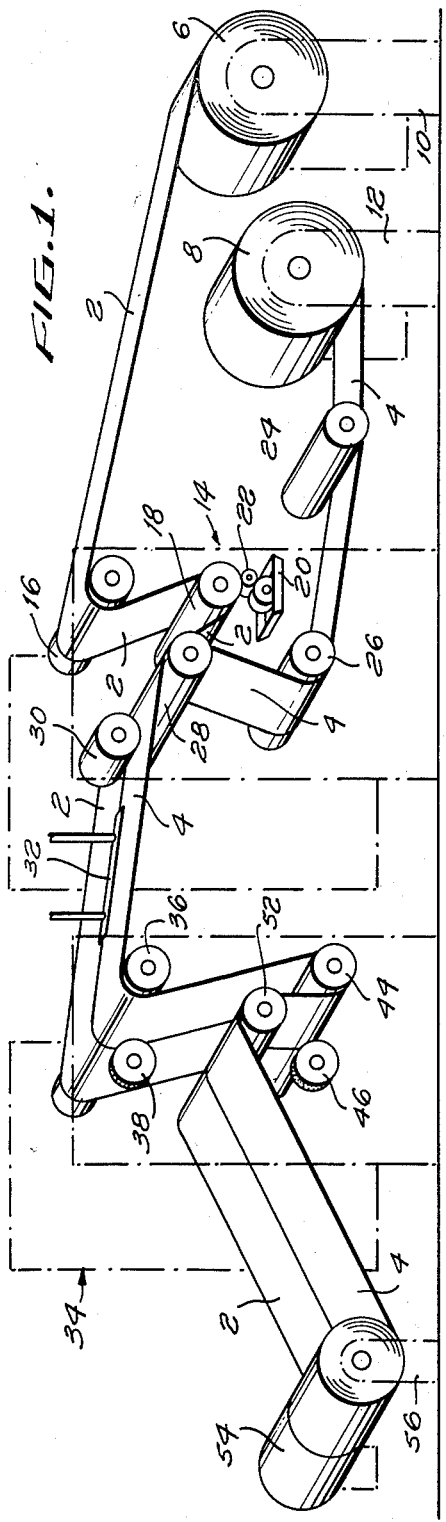

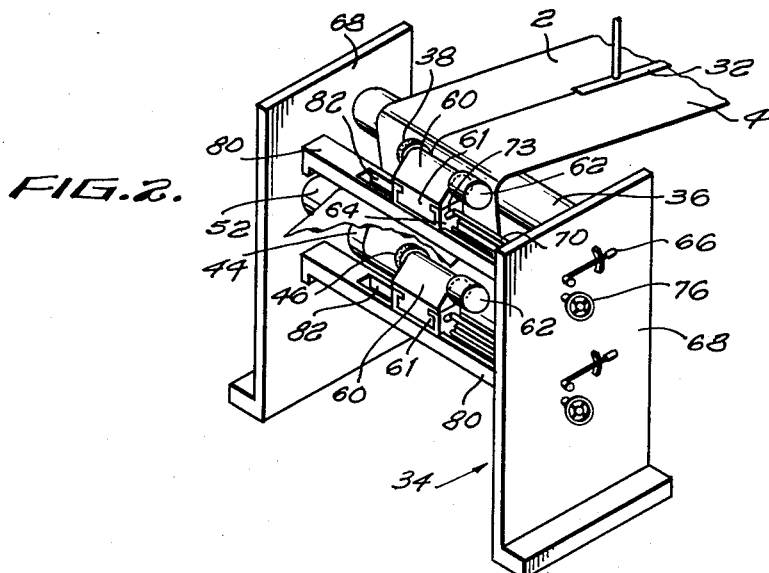
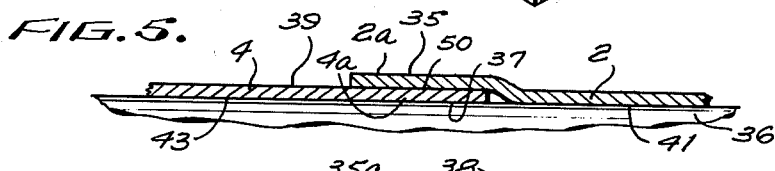
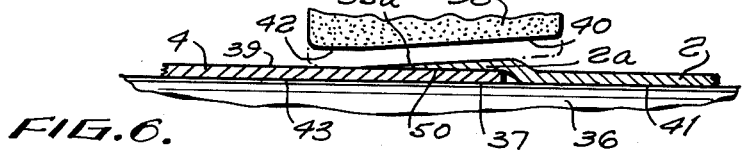
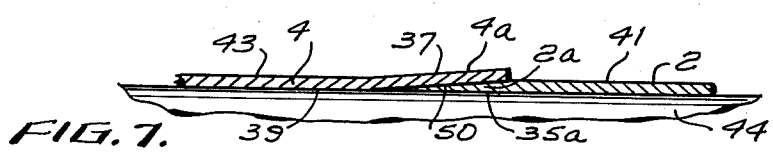
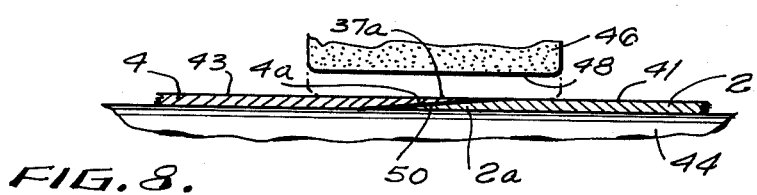

2,720,248

METHOD AND APPARATUS FOR JOINING OVERLAPPED SHEETS

Jerome L. Kipnis, Jacksonville, Fla., assignor to National Container Corporation, New York, N. Y., a corporation of Delaware Application June 1, 1954, Serial No. 433,642

20 Claims. (Cl. 154—42)

The present invention relates to a novel method for seam-joining a pair of overlapping sheets of material, and to an apparatus particularly designed for carrying out that method.

It is often required that a pair of sheets be joined together in overlapping relationship. For example, rolls of corrugating medium or liner board in sheet form are normally supplied in limited widths, and those sheets must be secured to one another in order to produce a composite sheet having a greater width. Not only must the seam between the two sheets be sufficiently strong to withstand the strains to which the composite sheet may be subjected in use, but it often must also be so inconspicuous in the finished product as not to call visual attention to the fact that the sheet is in fact composite in nature. Moreover, when, as is usually the case, the composite sheet must be stored or stock-piled after it has been formed, it is of prime importance that the seam between the individual sheets be of exactly the same thickness as the individual sheets themselves. If this is not the case, stacking of the sheets one on the other is rendered very difficult and, if the composite sheets are to be rolled up and if the seam is thicker than the individual sheets, a tight roll cannot be produced. There will always be clearance between adjacent sheets except along the comparatively narrow seamed portions thereof. Stacks or rolls formed from such composite sheets are completely unsatisfactory insofar as handling and shipping is concerned. They not only take up more space than they should, but it is extremely difficult to keep the adjacent sheets or convolutions from shifting or sliding laterally relative to one another.

The procedure which has most generally been used in the past is to skive or bevel those portions of the two individual sheets which are to be overlaped, apply adhesive to one or both of the skived surfaces, and then overlap the skived surfaces and secure them together by means of the adhesive. This method has been widely employed not because it produces a wholly satisfactory product but because it is the best method available. By careful practice a seam can be produced thereby which is only slightly thicker than the individual sheets, but that slight additional thickness is enough to produce serious problems insofar as the stacking, and particularly the rolling, of the composite sheet is concerned. If the seam is to be invisible the skived portions must mate exactly widthwise of the seamed area and, the adhesive between them having some thickness, the resultant seam is necessarily thicker than the individual sheets even if the skiving is performed in an exceedingly accurate manner. Moreover, great care must be exerted to ensure absolutely accurate registration between the skived sheet portions when they are overlapped. Failure to achieve proper alignment will result either in an unsightly seam, a seam having insufficient strength, or a seam having having extremely excessive thickness.

According to the method of the present invention a seam is produced which may readily be made of exactly the same thickness as the individual sheets, and the method is such that there is nothing particularly critical in any of the operating steps. The method involves the overlapping of the sheets in their original and unskived or unbeveled condition, followed by the contouring or abrading of the upper and lower surfaces of the overlap area so as to produce an overlap of exactly the same thickness as the individual sheets and with the seam running diagonally therethrough. To this end, after the sheets have been overlapped and preferably secured together in overlapping relation, one surface of the overlap area, here termed the "upper" surface thereof for convenience, is contoured in any appropriate manner, as through the use of an abrasive element, so that said surface is inclined with respect to the other or "lower" surface of the overlap area and preferably meets the exposed surface of the sheet overlapped thereby in a point. Thereafter the lower surface of the overlap area is contoured, as by abrading or the like, until it is parallel to the previously abraded upper surface of the overlap area and preferably until it is flush with the corresponding surfaces of the non-overlapped portions of the sheets. It is preferred to accomplish this contouring in each case by supporting on a flat support that surface of the overlap area which, in a given operation, is not to be contoured, and utilizing for the contouring agency an abrasive wheel or the like which, in the first operation, has an abrasive surface which makes an acute angle with the support, and in the second instance has an abrasive surface which is parallel with the support. In a machine which I have designed specifically to carry out this method, and which is here disclosed and claimed, the abrasive elements are so mounted as to be movable toward and away from the support over which the sheet is adapted to pass, thus permitting progressive abrading and conditioning the machine for operation upon sheets of varying thickness, the abrading elements also being movable laterally substantially parallel to the respective supports over which the sheets are adapted to pass so that the same machine can be used for the joining of sheets of different widths. While the instant machine as here disclosed is capable of forming a single seam between two sheets, it could of course readily be modified to produce a plurality of seams between three or more sheets.

To the accomplishment of the above, and to such other objects as may hereinafter appear, the present invention relates to a method and apparatus for joining a plurality of overlapped sheets of material so as to produce an overlap seam of predetermined thickness, and preferably of the same thickness as the individual sheets, all as defined in the appended claims and as described in this specification taken together with the accompanying drawings in which:

Fig. 1 is a schematic view illustrating the method and apparatus of the present invention as adapted for the continuous seaming of a pair of sheets of material such as paperboard or the like, the individual sheets being drawn from rolls and the composite sheet being rolled up for storage;

Fig. 2 is a three-quarter perspective view of the surface contouring assembly which forms a part of the apparatus disclosed in Fig. 1;

Figs. 3 and 4 are cross sectional views of an individual abrading unit of the surface contouring assembly, Fig. 3 being taken along the line 3—3 of Fig. 4 and Fig. 4 being taken along the line 4—4 of Fig. 3; and Figs. 5, 6, 7 and 8 are cross sectional schematic views taken widthwise through the composite sheet and illustrating various stages in the treatment of the overlap area, Fig. 5 illustrating the overlap area before the first contouring operation, Fig. 6 showing the overlap area after the first contouring operation has been completed, a portion of the abrading wheel being shown in solid lines thereabove so as to illustrate the configuration of its abrading face, the broken lines indicating the operative position of the abrading wheel relative to the sheets, Fig. 7 showing the condition of the overlap area just prior to the second contouring operation, and Fig. 8 illustrating the overlap area in its finished condition and after the second contouring operation has been performed, a portion of the abrading wheel being shown to illustrate the configuration of its abrading surface and the broken lines indicating the operative position of the abrading wheel relative to the sheets.

Reference will first be made to Fig. 1, which schematically illustrates the method of the present invention as applied to the continuous formation of an overlapped seam between a pair of long sheets of material such as corrugated board so as to produce a composite sheet having a width substantially equal to the combined widths of the individual sheets. The individual sheets 2 and 4 are pulled from rolls 6 and 8 respectively, each roll being rotatably mounted on a stand 10 or 12 respectively. The sheets 2 and 4 are first led to a gluer generally designated 14, the sheet 2 being fed over roller 16 and then under roller 18, a gluepot 20 of conventional nature applying adhesive by means of the roller 22 to that portion of the lower surface of the sheet 2 exposed at the roller 18 adjacent one sheet edge. The sheet 4 is passed under guiding and tensioning roller 24, then around roller 26, and then over roller 28, the sheet 2 also being passed over roller 28 in an overlapping position with respect to the sheet 4, its lower surface to which adhesive has been applied being in engagement with the upper surface of the sheet 4. The two sheets 2 and 4, as thus overlapped, are passed under pressure roller 30 and then are subjected to the action of a drying element 32, usually in the form of a heater, so as to set the adhesive and thus permanently secure the sheets 2 and 4 together in overlapped condition. The overlap area will then have the appearance shown in Fig. 5, the overlapping portions of the sheets 2 and 4 respectively being designated 2a and 4a. It will be apparent that the seam thus produced is entirely unacceptable for most applications, since it has a thickness somewhat greater than twice the thickness of the individual sheets 2 and 4, the increase over twice the thickness being due to the adhesive between the overlapped sheet portions 2a and 4a.

The composite sheet 2, 4 is then fed into a surface contouring assembly generally designated 34, where the overlap area is modified. The composite sheet is first passed over roller 36 which defines a flat support for the bottom surface of the overlap area. While the overlap area is thus supported, its condition will be substantially that shown in Fig. 5. The upper surface 35 of the overlap area is then contoured so as to be oriented at an angle to the lower surface 37, and preferably so as to meet the exposed upper surface 39 of the sheet 4 which it overlaps substantially at a point viewed in cross section, and as shown in Fig. 6. The contoured upper surface is designated 35a. In the apparatus here specifically disclosed the contouring is performed by means of an abrasive wheel 38 rotated in any appropriate manner so as to grind away part of the sheet portion 2a, the wheel 38 having an abrading surface that portion 40 of which engaging the overlap area upper surface 35 is inclined with respect to the supporting surface of the roller 36 to the degree desired, as determined by the width of the overlap area and the thickness of the sheets 2 and 4. The surface 40 may extend beyond the overlap area, and the wheel 38 may also overlap to some degree that portion of the sheet 4 to one side of the overlap area, the abrading surface 42 of the wheel 38 over that area being parallel to the surface of the roller 36. Hence there is nothing critical in the registration of the overlap area with the wheel 38.

The composite sheet is next caused to pass around the roller 44 so that the upper surface 35a thereof previously contoured by the wheel 38 is now against and supported by the roller 44, the lower surface 37 thereof which was previously against the roller 36 now being exposed. The sheets 2 and 4, and their overlap areas 2a and 4a respectively, will now assume the condition shown in Fig. 7. The now exposed surface 37 of the overlap area is then contoured so as to be parallel to the previously abraded upper surface 35a thereof, said lower surface, after contouring, being designated 37a and preferably being flush with the corresponding surfaces 41 and 43 of the non-overlapped portions of the sheets 2 and 4. As was the case in the previous contouring operation, the contouring is accomplished, in the apparatus here specifically disclosed, by means of a grinding wheel 46, but the abrading surface 48 of the wheel 46 is parallel to the surface of the roller 44 and hence parallel to the previously contoured upper surface 35a of the overlap area which is supported thereby. The wheel 46 is preferably wider than the overlap area so that its registration with the overlap area is not critical.

As a result, the overlap area is now of exactly the same thickness as the individual sheets 2 and 4. The sheet portions 2a and 4a which define the overlap area were originally of fully the same thickness as their respective sheets 2 and 4, but by reason of the contouring operation each of them has been tapered so that the glued seam 50 between them now extends diagonally through the overlap area. This finished seam is similar to that produced by initially skiving or beveling those portions of the sheets 2 and 4 to be overlapped and then securing the skived portions together, but by reason of the sequence of operations here taught, the overlap area is not even slightly thicker than the thickness of the individual sheets. Moreover, there is nothing particularly critical about the degree to which the sheets 2 and 4 are caused to overlap. The abrading wheels 38 and 46 are sufficiently wide so as to compensate for minor variations in the amount of overlap without affecting the end product. This is all in marked contrast to the previously accepted method, where the overlap area was always at least slightly thicker than the individual sheets and where any variation in the degree of overlap resulted either in unsightliness or in an increase in the thickness of the overlap area.

After the second contouring operation, the composite sheet is fed over roller 52 and is wound into a roll 54 mounted on a stand 56 and rotated in any appropriate manner so that the composite sheet is drawn thereon.

Details of the surface contouring assembly 34 are shown in Figs. 2–4. The abrasive wheel 38 is mounted on shaft 58 which extends through housing 60 and the opposite end of which is operatively connected to motor 62, the motor being energized in any appropriate manner so as to drive the wheel 38 in rotation. It is preferred that the abrasive wheel 38 be rotated in a clockwise direction as viewed in Figs. 1 and 2, so that its abrasive surface 40, 42 moves in the same direction as the composite sheet. The peripheral speed of the wheel 38 is greater than the speed at which the composite sheet passes over the roller 36 so that an abrasive action results.

The housing 60 is dovetailed at 61 with a mounting block 64 so as to be slidable relative to that block 64 in a direction toward and away from the roller 36, thus permitting the grinding wheel 38 to be moved toward and away from the composite sheet as it passes over the roller 36. In order to position grinding wheel 38 and thus accommodate the machine for operation with sheets of varying thicknesses, a lever 66 is provided on one of the upright supports 68 of the assembly 34, that lever being connected to a shaft 70 which passes through an elongated opening 73 in the mounting block 64 and which carries a gear 72 engageable with a rack 74 formed in the housing 60. Consequently swinging movement of the lever 66 will cause rotation of the gear 72 and thus will cause translation of the housing 60 relative to the mounting block 64 toward and away from the roller 36.

When sheets of different widths are employed, and particularly when the individual sheets are of unequal widths, the overlap area may fall at different points along the length of the roller 36. In order to permit the machine here disclosed to be fully flexible in use and to permit it to be accommodated to such eventualities, a handwheel 76 is provided on the upright 68, shaft 78 being rotated thereby and extending into the supporting block 64, the shaft 78 being externally threaded and the supporting block 64 being correspondingly internally threaded. Hence rotation of the handwheel 76 will cause the supporting block 64 to move laterally parallel to the roller 36, the housing 60 being carried along therewith, the gear 72 and the rack 74 being sufficiently long so that they will remain in operative engagement no matter in what lateral position the supporting block 64 may be.

In order to support the block 64 and the housing 60, a rail 80 extends between uprights 68 and is provided with a groove 82 into which the lower portion of the mounting block 64 is received, the block 64 thus riding along the rail 80.

A comparable arrangement is provided for mounting and moving the abrasive wheel 46, and no separate description thereof is necessary, the same reference numerals being applied to the parts thereof as have been applied with respect to the abrasive wheel 38.

It will be seen that the method of the present invention is particularly advantageous because it produces an inconspicuous seam between overlapped sheets which can have a thickness exactly the same as each of the individual sheets. Hence the composite sheets may be stacked or rolled in fully the same manner as though they were of one piece construction. Moreover, this very desirable result is reliably obtained without involving any delicate or precision operations. The apparatus here specifically disclosed is particularly well adapted for the attainment of the above objects and may readily be adjusted so as to be used with sheets of different thickness and different widths.

While the apparatus of the present invention has been here disclosed as having but a single pair of abrasive wheels 38 and 46, thus being adapted to join a pair of sheets, it will be obvious that by mere duplication of parts machines can be constructed capable of simultaneously producing a plurality of seams between three or more sheets.

While but a single embodiment of the apparatus of the present invention has been here disclosed, it will be apparent that many variations may be made in the specific details thereof, all without departing from the spirit of the invention as defined in the following claims.

I claim:

1. The method of splicing a pair of sheets which comprises overlapping one sheet on the other so as to define an overlap area having upper and lower surfaces, contouring the upper surface of said overlap area so that it is inclined relative to said lower surface, and then contouring said lower surface until it is parallel to said upper surface, thereby defining a seamed area the upper and lower surfaces of which are parallel to one another and the seam in which extends diagonally therethrough, the overlapped portions of said sheets being secured to one another at said seam at some time during said method.

2. The method of splicing a pair of sheets which comprises overlapping one sheet on the other so as to define an overlap area having upper and lower surfaces, securing the overlapping sheet portions together, contouring the upper surface of said overlap area so that it is inclined relative to said lower surface, and then contouring said lower surface until it is parallel to said upper surface, thereby defining a seamed area the upper and lower surfaces of which are parallel to one another and the seam in which extends diagonally therethrough.

3. The method of splicing a pair of sheets which comprises overlapping one sheet on the other so as to define an overlap area having upper and lower surfaces, abrading the upper surface of said overlap area so that said upper surface is inclined upwardly relative to said lower surface and inwardly relative to the sheet of which it is a part, and then abrading said lower surface of said overlap area until it is parallel to said upper surface, thereby defining a seamed area the upper and lower surfaces of which are parallel to one another and the seam in which extends diagonally therethrough, said overlapped areas being secured to one another at said seam at some time during said method.

4. The method of splicing a pair of sheets which comprises overlapping one sheet on the other so as to define an overlap area having upper and lower surfaces, securing the overlapping sheet portions together, abrading the upper surface of said overlap area so that said upper surface is inclined upwardly relative to said lower surface and inwardly relative to the sheet of which it is a part, and then abrading said lower surface of said overlap area until it is parallel to said upper surface, thereby defining a seamed area the upper and lower surfaces of which are parallel to one another and the seam in which extends diagonally therethrough.

5. The method of splicing a pair of sheets which comprises overlapping one sheet on the other so as to define an overlap area having upper and lower surfaces, contouring the upper surface of said overlap area so that it is inclined relative to said lower surface and meets the sheet overlapped thereby substantially in a point, and then contouring said lower surface until it is parallel to said upper surface, thereby defining a seamed area the upper and lower surfaces of which are parallel to one another and the seam in which extends diagonally therethrough, said overlapped areas being secured to one another at said seam at some time during said method.

6. The method of splicing a pair of sheets which comprises overlapping one sheet on the other so as to define an overlap area having upper and lower surfaces, contouring the upper surface of said overlap area so that it is inclined relative to said lower surface and meets the sheet overlapped thereby substantially in a point, and then contouring said lower surface until it is parallel to said upper surface and on a level with the corresponding surfaces of the non-overlapped portions of each sheet, thereby defining a seamed area the upper and lower surfaces of which are parallel to one another and substantially flush with the upper and lower surfaces of the spliced sheets and the seam in which extends diagonally therethrough, said overlapped areas being secured to one another at said seam at some time during said method.

7. The method of splicing a pair of sheets which comprises overlapping one sheet on the other so as to define an overlap area having upper and lower surfaces, abrading the upper surface of said overlap area so that said upper surface is inclined upwardly relative to said lower surface and inwardly relative to the sheet of which it is a part and meets the sheet overlapped thereby substantially in a point, and then abrading said lower surface of said overlap area until it is parallel to said upper surface, thereby defining a seamed area the upper and lower surfaces of which are parallel to one another and the seam in which extends diagonally therethrough, said overlapped areas being secured to one another at said seam at some time during said method.

8. The method of splicing a pair of sheets which comprises overlapping one sheet on the other so as to define an overlap area having upper and lower surfaces, abrading the upper surface of said overlap area so that said upper surface is inclined upwardly relative to said lower surface and inwardly relative to the sheet of which it is a part and meets the sheet overlapped thereby substantially in a point, and then abrading said lower surface of said overlap area until it is parallel to said upper surface and on a level with the corresponding surfaces of the non-overlapped portions of each sheet, thereby defining a seamed area the upper and lower surfaces of which are parallel to one another and substantially flush with the upper and lower surfaces of the spliced sheets and the seam in which extends diagonally therethrough, said overlapped areas being secured to one another at said seam at some time during said method.

9. The method of splicing a pair of sheets which comprises overlapping one sheet on the other so as to define an overlap area having upper and lower surfaces, securing the overlapping sheet portions together, abrading the upper surface of said overlap area so that said upper surface is inclined upwardly relative to said lower surface and inwardly relative to the sheet of which it is a part and meets the sheet overlapped thereby substantially in a point, and then abrading said lower surface of said overlap area until it is parallel to said upper surface, thereby defining a seamed area the upper and lower surfaces of which are parallel to one another and the seam in which extends diagonally therethrough.

10. The method of splicing a pair of sheets which comprises overlapping one sheet on the other so as to define an overlap area having upper and lower surfaces, securing the overlapping sheet portions together, abrading the upper surface of said overlap area so that said upper surface is inclined upwardly relative to said lower surface and inwardly relative to the sheet of which it is a part and meets the sheet overlapped thereby substantially in a point, and then abrading said lower surface of said overlap area until it is parallel to said upper surface and on a level with the corresponding surfaces of the non-overlapped portions of each sheet, thereby defining a seamed area the upper and lower surfaces of which are parallel to one another and substantially flush with the upper and lower surfaces of the spliced sheets and the seam in which extends diagonally therethrough.

11. The method of splicing a pair of sheets which comprises overlapping one sheet on another so as to define an overlap area having upper and lower surfaces, abrading the upper side of said overlap area with a tool having an abrading face making an acute angle with the lower surface of said overlap area and extending away from said lower surface in the direction of the width of the sheet of which the thus abraded overlap area is a part, and then abrading said lower surface of said overlap area with a tool having an abrading face parallel to said upper surface, thereby defining a seamed area the upper and lower surfaces of which are parallel to one another and the seam in which extends diagonally therethrough, said overlapped areas being secured to one another at said seam at some time during said method.

12. The method of splicing a pair of sheets which comprises overlapping one sheet on another so as to define an overlap area having upper and lower surfaces, abrading the upper side of said overlap area with a tool having an abrading face making an acute angle with the lower surface of said overlap area and extending away from said lower surface in the direction of the width of the sheet of which the thus abraded overlap area is a part until the abraded upper surface meets the exposed surface of the other sheet substantially in a point, and then abrading said lower surface of said overlap area with a tool having an abrading face parallel to said upper surface, thereby defining a seamed area the upper and lower surfaces of which are parallel to one another and the seam in which extends diagonally therethrough, said overlapped areas being secured to one another at said seam at some time during said method.

13. The method of splicing a pair of sheets which comprises overlapping one sheet on another so as to define an overlap area having upper and lower surfaces, securing the overlapping sheet portions together, abrading the upper side of said overlap area with a tool having an abrading face making an acute angle with the lower surface of said overlap area and extending away from said lower surface in the direction of the width of the sheet of which the thus abraded overlap area is a part until the abraded upper surface meets the exposed surface of the other sheet substantially in a point, and then abrading said lower surface of said overlap area with a tool having an abrading face parallel to said upper surface until said lower surface of said overlapping area is substantially on a level with the adjacent sheet surface, thereby defining a seamed area the upper and lower surfaces of which are parallel to one another and substantially flush with the upper and lower surfaces of the spliced sheets and the seam in which extends diagonally therethrough at some time during said method.

14. The method of continuously splicing a pair of sheets which comprises feeding said sheets continuously to a first operating area, overlapping said sheets at said first operating area so as to define an overlap area having upper and lower surfaces, securing the overlapping sheet portions together, feeding the overlapped sheets to a second operating area, where they pass over a support which is flat beneath the overlap area, the lower surface of said overlap area engaging said support, abrading the upper surface of said overlap area with a tool having an abrading face making an acute angle with said flat portion of said support, feeding the thus abraded overlap to a third operating area where it passes over a second support which is flat beneath said overlap area, the abraded upper surface of said overlap area engaging said second support, and abrading the lower surface of said overlap area with a tool having an abrading face parallel to said second support, thereby defining a seamed area the upper and lower surfaces of which are parallel to one another and the seam in which extends diagonally therethrough.

15. The method of continuously splicing a pair of sheets which comprises applying a layer of adhesive to an edge portion of one of said sheets, securing the other sheet to said one sheet so that a portion of said other sheet overlaps the area of said one sheet to which said adhesive has been applied, thereby securing said two sheets together in overlapped condition and defining an overlap area having upper and lower surfaces, passing the overlapped sheets over a first support while said sheets are under tension, the lower surface of said overlap area engaging said support and said support being flat beneath said overlap area, abrading the upper surface of said overlap area with a tool having an abrading face making an acute angle with said flat portion of said support until said abraded upper surface meets the adjacent sheet surface substantially in a point, causing the thus abraded overlap to pass over a second support while said sheets are under tension and with the previously abraded upper surface engaging said second support, said second support being flat beneath said overlap area, and abrading the lower surface of said overlap area with a tool having an abrading face parallel to said flat portion of said second support until said abraded lower surface is substantially on a level with the adjacent sheet surfaces, thereby defining a seamed area the upper and lower surface of which are parallel to one another and substantially flush with the upper and lower surfaces of the spliced sheets.

16. A machine for forming a flat seam in a pair of overlapped sheets comprising a first guide, a first abrading unit opposite said first guide and including a first abrading element having an abrading surface inclined with respect to the surface of said first guide, a second guide, a second abrading unit opposite said second guide and including a second abrading element having an abrading surface parallel to the surface of said second guide, and means for conveying a pair of overlapped sheets between said first guide and said first abrasive element with one surface of said overlap presented to said first abrasive element and then conveying said overlapped sheets between said second guide and said second abrasive element with the opposite surface of said overlap presented to said second abrasive element.

17. The machine of claim 16, in which said abrading elements are rotatable, and means operatively connected to said elements for rotating them relative to their respective guides for abrading purposes.

18. The machine of claim 17, in which said elements are rotated so that their overlap-engaging surfaces rotate in the same direction as said overlap sheets move over said guide, but at a greater peripheral speed.

19. In the machine of claim 17, means operatively connected to said abrading elements for moving them toward and away from their respective guides.

20. In the machine of claim 17, means operatively connected to said abrading elements for moving them laterally substantially parallel to said guides.

References Cited in the file of this patent

UNITED STATES PATENTS

| | | |
|---|---|---|
| 137,104 | Spencer | Mar. 25, 1873 |
| 1,505,867 | Cote | Aug. 19, 1924 |
| 1,827,887 | Gillespie | Oct. 20, 1931 |
| 2,483,707 | Magee | Oct. 4, 1949 |

FOREIGN PATENTS

| | | |
|---|---|---|
| 520,965 | Great Britain | May 8, 1940 |